United States Patent Office 3,598,667
Patented Aug. 10, 1971

3,598,667
LOW TEMPERATURE SENSITIVE ALUMINUM-ENRICHED POLYURETHANE PROPELLANT CONTAINING CALCIUM CARBONATE
Fred H. Brock, Covina, Calif., assignor to the United States of America as represented by the Secretary of the Navy
No Drawing. Filed Oct. 22, 1965, Ser. No. 502,688
Int. Cl. C06d 5/06
U.S. Cl. 149—19                      3 Claims

ABSTRACT OF THE DISCLOSURE

An aluminum-enriched polyurethane propellant with low temperature sensitivity obtained by adding a small amount of calcium carbonate to the formulation.

---

This invention relates to a method for the preparation of a composite solid propellant having decreased temperature sensitivity and to the product thereof; particularly to an aluminum-enriched polyurethane propellant with low temperature sensitivity.

Many of the present day composite propellants use powdered aluminum as a fuel and ammonium perchlorate, potassium perchlorate or ammonium nitrate as the oxidizer. The various families of composite propellants differ mainly in the binder material used, and they take their names from the binders: polysulfide, polyurethane, polybutadiene-acrylic acid and so forth. They all have varying temperature coefficients. The present invention provides a method for obtaining a low temperature sensitive propellant by the use of calcium carbonate. It is an object of the present invention to provide a method for the preparation of a propellant having decreased temperature sensitivity for use in modern missile systems.

Another object is to provide an aluminum-enriched propellant which is relatively insensitive at ambient temperature.

Yet another object is to provide a method for preparing propellant formulations which will result in grains having a longer firing duration.

Other objects, features and many of the advantages of this invention will become better understood as the description thereof proceeds.

The formulation improved by the present invention comprises aluminum, the inorganic oxidizer, ammonium perchlorate, carbon black (P-33) and polyurethane. The polyurethane binder used is based on polymers formed by the reaction of diisocyanates and diols. For adequate mechanical properties crosslinking between polymer chains is required. This is generally accomplished by using some triol or quadrol along with the diol. To this mixture of ingredients calcium carbonate was added and it was discovered that amounts up to 3 percent by weight had a marked effect on the temperature sensitivity of the propellant. For example, a formulation comprising

|                       | Percent |
|-----------------------|---------|
| Ammonium perchlorate  | 65.83   |
| Aluminum              | 15.0    |
| Calcium carbonate     | 1.74    |
| Carbon black          | .37     |
| Polyurethane          | 17.05   | was blended together in mixer cast into a mold and cured for several days at 110° F. The following data showed its low-sensitivity:

Burning rate at 60° F., 1000 p.s.i.a. ____in./sec__ 0.288
Pressure exponent, 60° F., 1000 p.s.i.a. _____ 0.189
Temperature coefficients, −75 to 170° F., 1000 p.s.i.a.:
    $\mu$ percent/° F. _____ 0.07
    $\pi k$ percent/° F. _____ 0.07

Several examples are set out in Table I to show that up to 3 percent by weight calcium carbonate decreased the temperature sensitivity of the propellant grain.

TABLE I
[Ballistic parameters of aluminum-enriched polyurethane propellants containing calcium carbonate]

| | Weight percent | | | | | Burning rate (in./sec.) 60° F., 1,000 p.s.i.a. | Pressure exponent, 60° F., 1,000 p.s.i.a. | Temperature coefficients, −75 to 170° F., 1,000 p.s.i.a. (percent/° F.) | |
|---|---|---|---|---|---|---|---|---|---|
| Sample | Ammonium perchlorate | Aluminum | Calcium carbonate | Carbon black (P-33) | Polyurethane binder | | | $\mu$ | $\pi K$ |
| I | 63 | 15 | 0.50 | 0.10 | 21.4 | 0.257 | 0.210 | 0.10 | 0.12 |
| II | 67 | 15 | 0.50 | 0.10 | 17.4 | 0.320 | 0.185 | 0.08 | 0.10 |
| III | 63 | 15 | 1.50 | 0.50 | 20.0 | 0.264 | 0.375 | 0.07 | 0.10 |
| IV | 67 | 15 | 1.50 | 0.50 | 16.0 | 0.450 | 0.280 | 0.09 | 0.13 |
| V | 65.70 | 15 | 1.18 | 0.50 | 17.62 | 0.292 | 0.200 | 0.06 | 0.07 |
| VI | 65.83 | 15 | 1.74 | 0.37 | 17.05 | 0.288 | 0.189 | 0.07 | 0.07 |
| VII | 66.66 | 15 | 2.73 | 0.06 | 15.52 | 0.285 | 0.376 | 0.04 | 0.06 |

Data summarized in Table II below were obtained from Crawford-bomb measurements, from three mini-midget motors cast from a one-pound batch, and from three mini-midget motors cast from a ten-pound batch. The formulation for this data is that of Sample VII of Table I herein.

TABLE II.—TEMPERATURE-SENSITIVITY DATA

| Batch size, lb. | Motor type | Temperature, °F. | Pressure $P''_c$, p.s.i.a. | Burning rate, in./sec. | Pressure exponent, 1,000 p.s.i.a. | Temperature sensitivity −40 to +180° F. (percent/° F.) | |
|---|---|---|---|---|---|---|---|
| | | | | | | μ | πk |
| 1 | Crawford bomb (strands) | −75 | 1,000 | 0.265 | 0.380 | *0.04 | *0.06 |
| | | +60 | 1,000 | 0.285 | 0.376 | | |
| | | +170 | 1,000 | 0.290 | 0.261 | | |
| 1 | Mini-midget (100 g.) | −40 | 1,134 | 0.324 | | 0.05 | 0.05 |
| | | +60 | 328 | 0.265 | | | |
| | | +180 | 745 | 0.311 | | | |
| 10 | Mini-midget | −40 | 1,157 | 0.315 | | 0.03 | 0.04 |
| | | +60 | 1,108 | 0.332 | | | |
| | | +180 | 965 | 0.317 | | | |

*Temperature range from −75 to +170° F.

NOTE.—The temperature-sensitivity results from the above data are in good agreement, and show low values of μ and πk.

Obviously many modifications and variations of the present invention are possible in the light of the above teachings. It is therefore to be understood that within the scope of the appended claims the invention may be practiced otherwise than as specifically described.

What is claimed is:

1. A method for the preparation of composite propellants having decreased temperature sensitivity which comprises
adding up to 3 percent by weight calcium carbonate to a composite propellant formulation consisting essentially of aluminum, ammonium perchlorate and polyurethane.

2. A method for the preparation of an aluminum-enriched polyurethane propellant having a low temperature sensitivity which comprises
blending together at ambient temperature from 60 to 70 percent by weight ammonium perchlorate, 15 percent by weight aluminum, from 10 to 25 percent by weight polyurethane and from 0.5 to 3 percent by weight calcium carbonate, casting into a mold, and curing at about 110° F. for several days.

3. A low-temperature sensitive propellant formulation comprising

| Ingredients: | Percent by weight |
|---|---|
| Ammonium perchlorate | 60 to 70 |
| Aluminum | 15 |
| Polyurethane | 10 to 25 |
| Calcium carbonate | 0.5 to 3 |

References Cited
UNITED STATES PATENTS

| 2,904,420 | 9/1959 | Holker | 149—46X |
| 2,984,556 | 5/1961 | Talley | 149—19 |
| 3,000,715 | 9/1961 | Lawrence | 149—19 |
| 3,002,830 | 10/1961 | Barr | 149—19 |

BENJAMIN R. PADGETT, Primary Examiner

U.S. Cl. X.R.

149—20, 42